Sept. 25, 1951     C. G. YATES, JR     2,569,362
DELAY CIRCUIT
Filed July 15, 1948
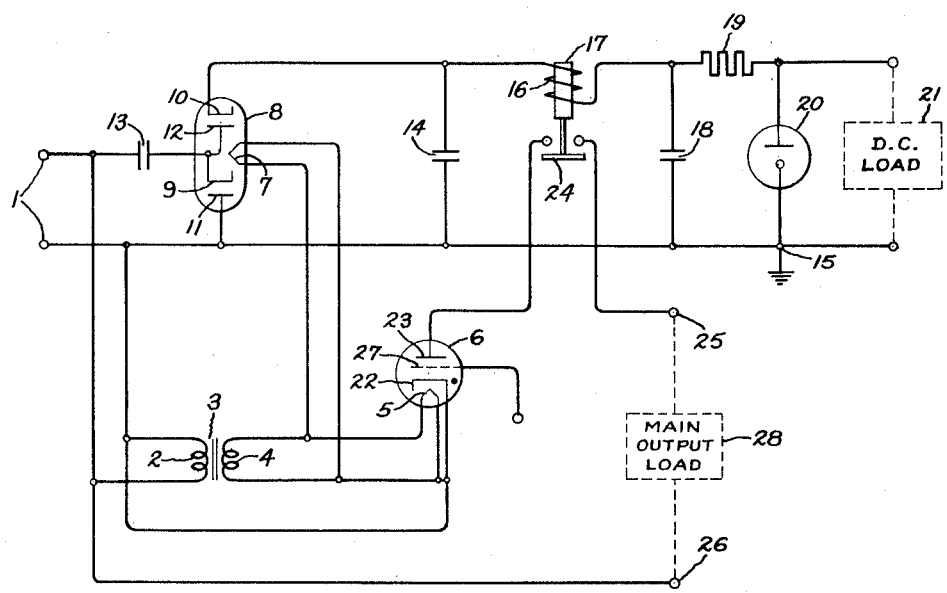
Inventor:
Charles G. Yates, Jr,
by Claude A. Mott
His Attorney.

Patented Sept. 25, 1951

2,569,362

UNITED STATES PATENT OFFICE 2,569,362

DELAY CIRCUIT

Charles G. Yates, Jr., Schenectady, N. Y., assignor to General Electric Company, a corporation of New York Application July 15, 1948, Serial No. 38,919

2 Claims. (Cl. 171—97)

This invention relates to a circuit for a power supply and more particularly to an electronic arrangement for introducing time delay in the application of power to a circuit.

To avoid damage, certain electronic discharge devices such as gaseous tubes known in the art as thyratrons, must have a cathode warm-up period before the anode voltage can be applied. There have been various attempts to introduce an automatic time delay between the application of heater power and anode power, and in some cases, this has been accomplished by utilizing an additional tube containing a bi-metallic strip surrounded by a heater winding. When power is applied to the thyratron heaters, it is also applied to the bi-metallic heater winding. After a given time, the bi-metallic strip bends a predetermined amount to close a set of contacts thus applying anode voltage, either through contacts or through a relay actuated by closure of these contacts depending upon whether or not the bi-metallic heater winding can withstand continuous excitation.

While alternating voltage is commonly employed as a source of supply in circuits of the gaseous tube type, many electronic discharge device applications require an additional D.-C. supply for the anodes of amplifier tubes. This is usually obtained from the output of a rectifier contained within a common power supply unit. Normally, the rectifier output is smoothed out by a filter circuit comprising two condensers and an inductor. Where weight and size are critical, the rectified alternating voltage may be filtered by resistors and capacitors since inductors are larger and heavier than resistors. However, inductors are preferable since they provide a much smoother D.-C. supply.

It is an object of my invention to provide in a power supply unit for furnishing both D.-C. and A.-C., an inductive means which is operative to apply anode voltage only after a predetermined time delay.

Another object of my invention is to provide a simplified time delay circuit having a reduced number of components.

According to my invention, I provide a circuit comprising a gaseous-type tube and a rectifier supplied from a common alternating voltage source, and instead of using a conventional inductor to filter the output from the rectifier, I utilize an inductive element in the form of a relay, the winding of which provides filtering action due to inherent inductance, and the armature of which after a predetermined delay, is adapted to connect the alternating voltage supply to the anode of the gaseous tube.

My invention will be more fully understood by referring now to the drawing which shows a schematic diagram of my simplified delay circuit.

An alternating voltage is supplied at terminal 1 to feed the primary windings 2 of a heater transformer 3, the secondary 4 of which is connected to furnish a suitable voltage to the heater 5 of an electronic discharge device 6 of the gaseous type. Secondary 4 simultaneously provides a voltage to the heater 7 of rectifier 8. The rectifier 8 may be of the duodiode type as shown which comprises two cathodes 9 and 10 and two anodes 11 and 12. While the rectifier 8 may have its elements connected in any known way to provide simple rectification, I prefer to connect these elements to obtain voltage doubling by joining the cathode 9 and anode 12 and connecting these elements to one side of the alternating voltage supply 1 through an input condenser 13. The anode 11 is connected directly to the other side of the alternating voltage supply 1. In this manner I am able to obtain a rectified voltage of higher magnitude between cathode 10 and anode 11 across which there is placed a capacitor 14 which forms part of a filtering network across the output of rectifier 8. One end of capacitor 14 is grounded at 15 while the other end is connected to a relay having a winding 16 and a core 17. Between the other end of winding 16 and ground 15, a further smoothing capacitor 18 is connected. The output voltage across capacitor 18 is applied through a resistor 19 to the terminals of a voltage regulator tube 20 which terminals also serve as a means from which the D.-C. load 21 may be taken.

Referring now to the A.-C. portion of my circuit, it will be seen that the grounded end of the alternating voltage supply 1 is connected to the cathode 22 of tube 6. The anode 23 may be connected through a relay armature 24 to one terminal 25 of the main output load, the other terminal 26 being connected to the ungrounded terminal of alternating voltage supply 1. The control signal to the tube 6 is applied to the grid 27. When sufficient voltage appears across the relay winding 16, the armature 24 will pick up and apply alternating voltage through load 28 to the anode 23.

With the foregoing understanding of the elements and their organization, the operation of my invention will be readily understood from the following explanation. When alternating voltage is applied at the terminals 1, the heaters 5 and 7 will be simultaneously energized through the transformer 3. The rectifier 8 will not pass current immediately since there is a natural delay of from 10 to 20 seconds or longer (depending upon the particular rectifier used) due to the warming-up period of the cathode. Of course, the relay armature 24 will not pick up either until after the rectifier has started to pass rectified current. This natural delay gives the gaseous tube cathode 22 a chance to warm up to the point after which no damage will occur if the supply voltage is applied to the anode 23. As the rectifier does begin to pass current, a voltage is developed across the winding 16 which upon reaching a sufficient value will pick up relay armature 24 so as to effect energization of the anode 23. A load voltage will then be available across terminals 25, 26 which voltage may be controlled by the signal applied to grid 27.

The relay winding 16 and core 17 constitutes a very effective filter for the rectifier output because of high inductive properties, particularly when employed in aircraft which now have a standard frequency of 400 cycles.

It will be seen from the foregoing explanation that the bi-metallic type time delay tube may be entirely eliminated and that the relay previously necessary in conjunction with the time delay tube, now serves a double purpose according to my invention; one, it is a filter inductance in the D.-C. power supply, thereby obviating the need for a component otherwise needed for filtering; and two, it provides a means for delaying anode energization.

It will be obvious that my invention may be operated as an under voltage device, since the relay will drop out in case the supply voltage falls to a low value. Many other applications will be readily apparent to one skilled in the art. Therefore, while I have shown a particular embodiment of my invention, the appended claims are intended to cover of course, such modifications as lie within the true spirit and scope of the invention.

What I claim is:

1. Apparatus for supplying an alternating voltage load and a D.-C. load from an alternating voltage source comprising a grid-controlled electronic discharge device having a heater and further comprising a cathode and an anode connected to be supplied from said source and in series with said alternating voltage load, means operative after an initial time delay for rectifying voltage from said source, and a filter network connected to the output of said rectifying means and having connections for supplying said D.-C. load and further comprising a shunt input capacitor, a shunt output capacitor and a relay operative to connect and disconnect said discharge device from said alternating voltage load respectively upon energization and de-energization thereof, said relay having a highly inductive winding forming a continuously unbroken circuit between said D.-C. connections and said rectifying means.

2. Apparatus for supplying an alternating voltage load and a D.-C. load from an alternating voltage source comprising rectifier means connected to said source for deriving a direct voltage after an initial time delay period, means for filtering said direct voltage for supplying said D.-C. load including a shunt input capacitor, a shunt output capacitor and a relay having an inductive winding, said winding forming a continuously unbroken path between the D.-C. load and said rectifier means, and a gaseous discharge device, said relay coupling the electron discharge path of said discharge device in series between said source and said alternating voltage load.

CHARLES G. YATES, Jr.

REFERENCES CITED

The following references are of record in the file of this patent:

UNITED STATES PATENTS

| Number | Name | Date |
| --- | --- | --- |
| 1,968,198 | Gibbs | July 31, 1934 |
| 2,003,877 | Blatterman | June 4, 1935 |
| 2,186,815 | Alexanderson | Jan. 9, 1940 |
| 2,227,490 | Draper | Jan. 7, 1941 |
| 2,245,385 | Brokaw et al. | June 10, 1941 |
| 2,337,905 | Livingston | Dec. 28, 1943 |

FOREIGN PATENTS

| Number | Country | Date |
| --- | --- | --- |
| 487,385 | Germany | Jan. 31, 1929 |